Dec. 11, 1945.  R. B. TEDROW  2,390,564
MOLDING MACHINE
Filed March 3, 1943   5 Sheets-Sheet 1
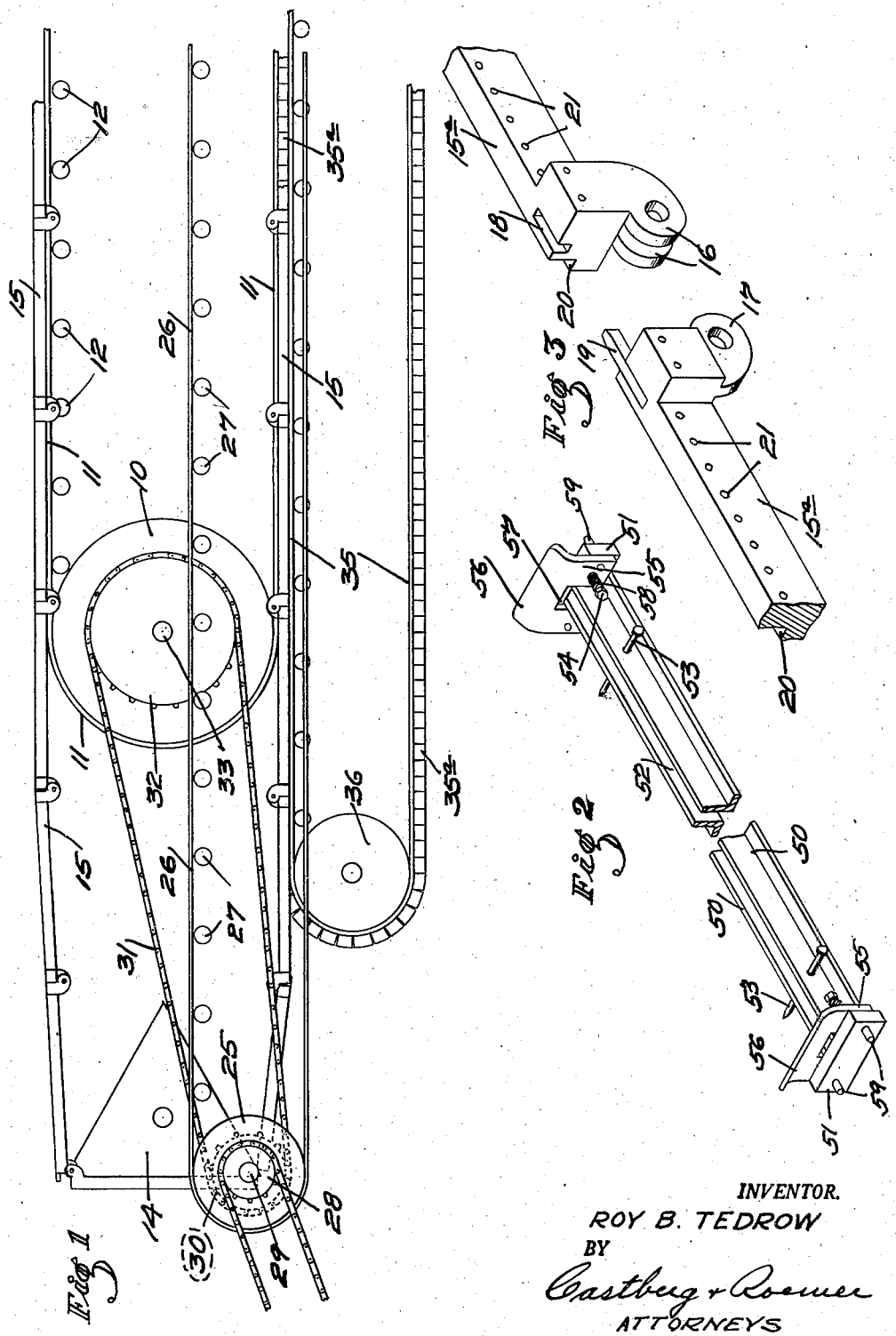
INVENTOR.
ROY B. TEDROW
BY
Castberg & Roemer
ATTORNEYS

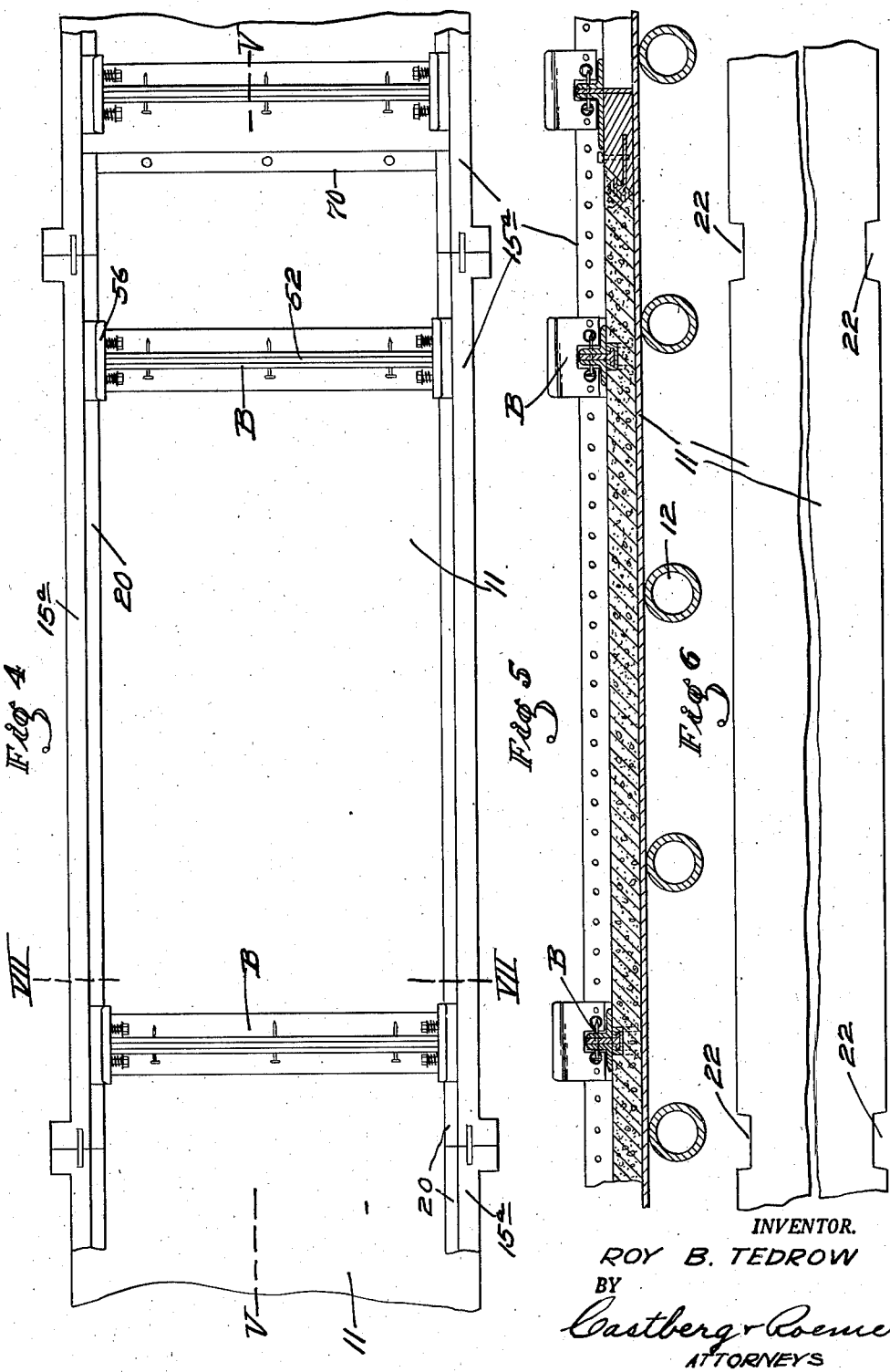

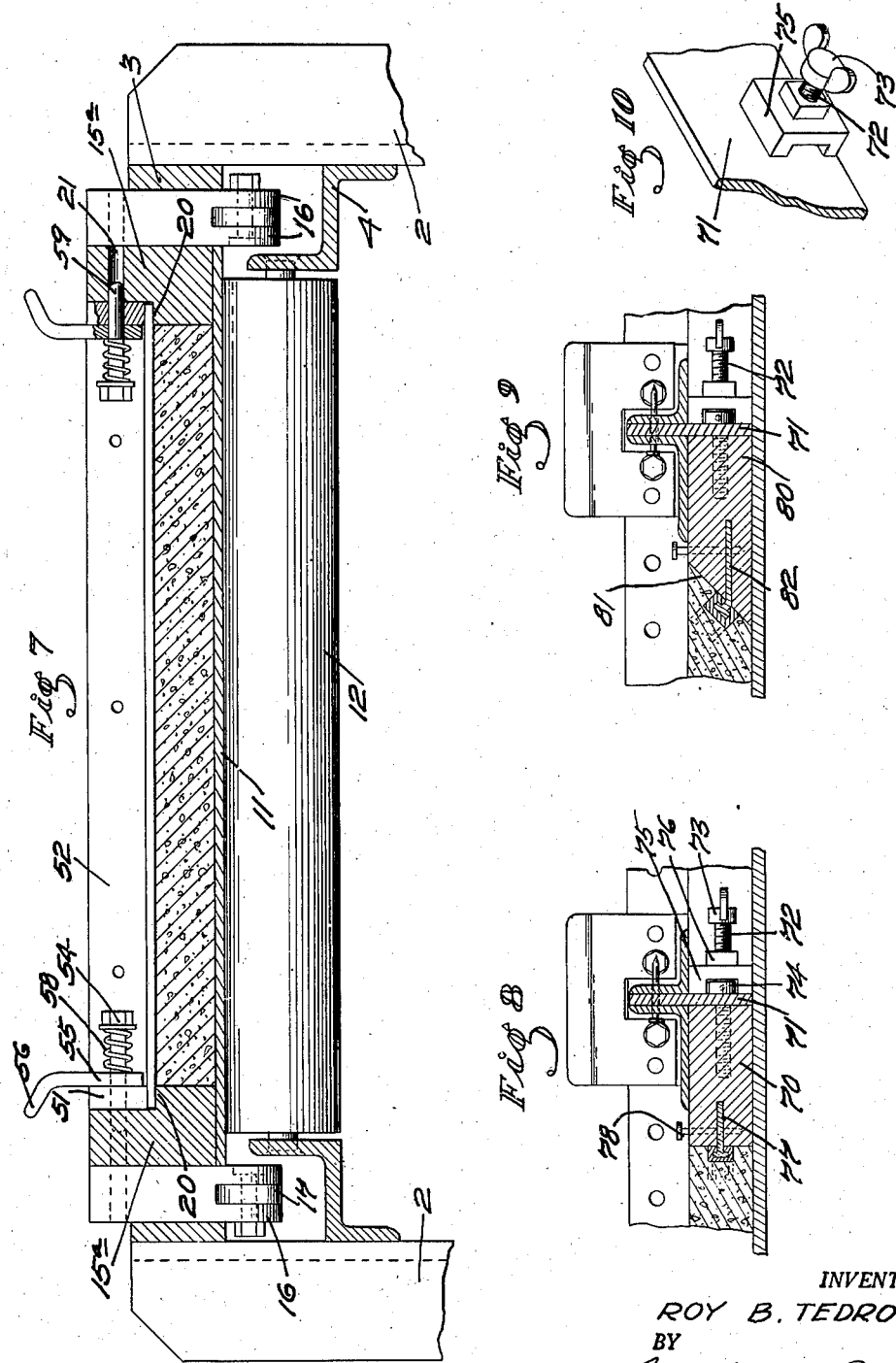

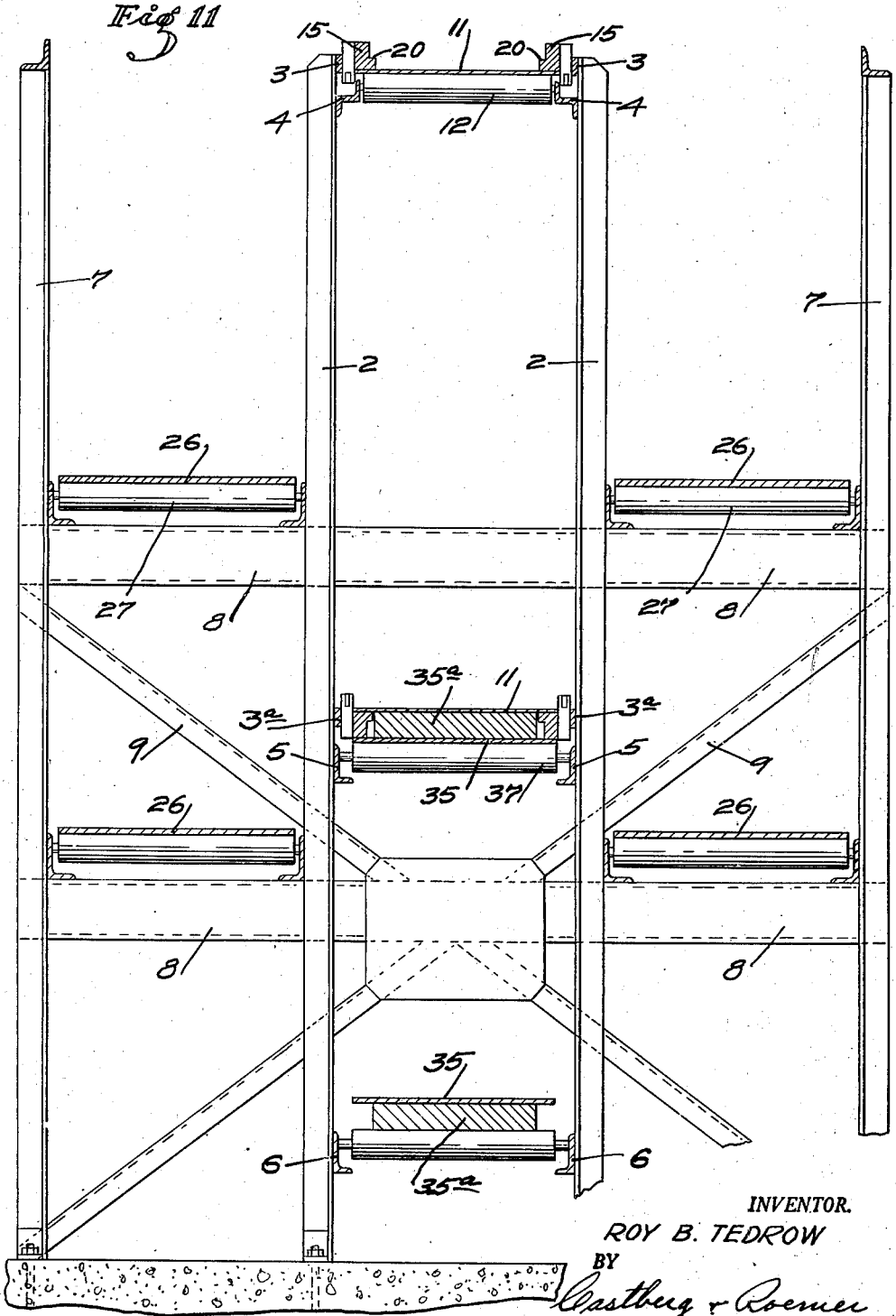

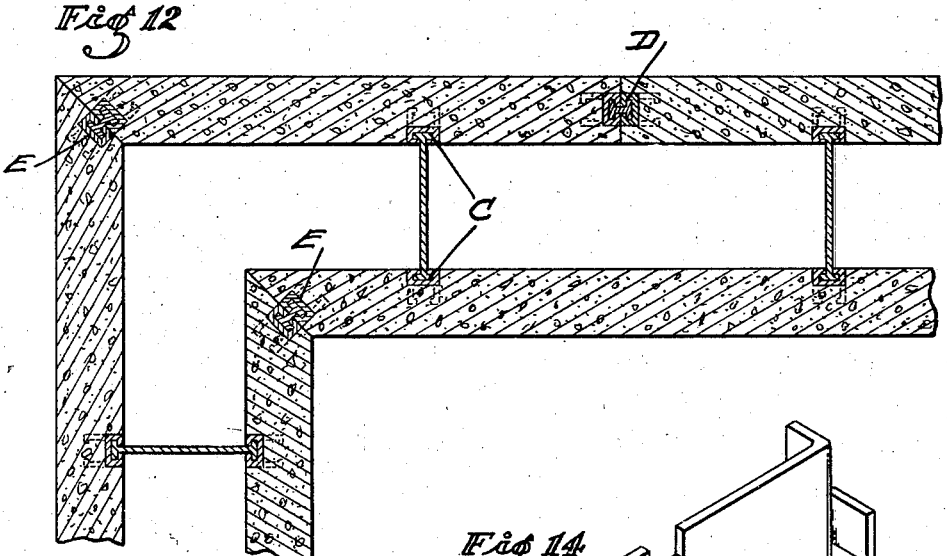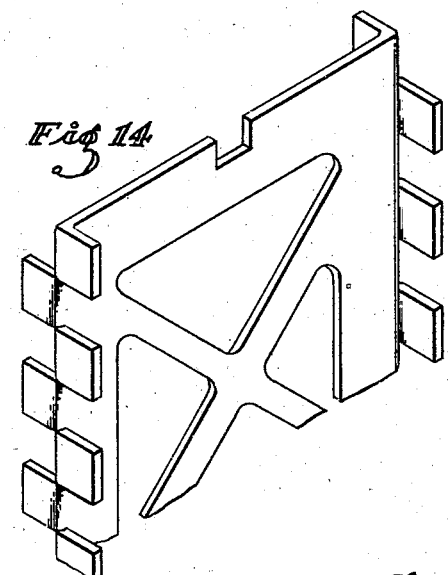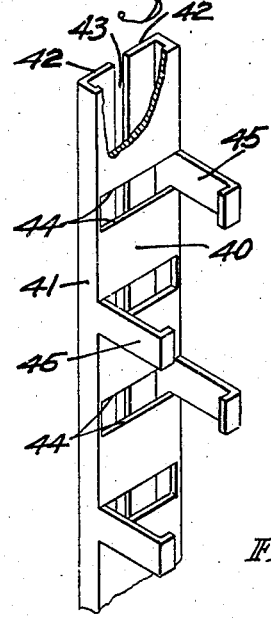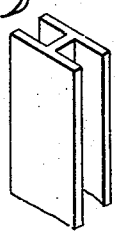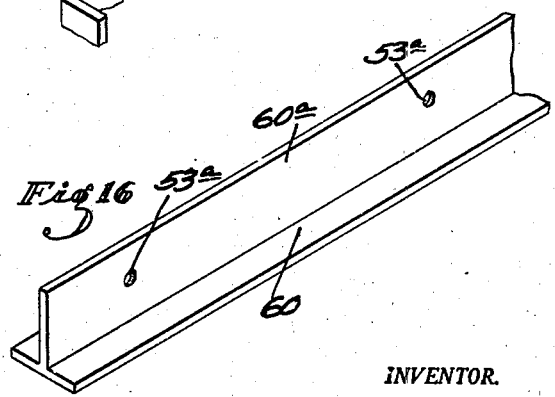

Patented Dec. 11, 1945

2,390,564

UNITED STATES PATENT OFFICE 2,390,564

MOLDING MACHINE

Roy B. Tedrow, San Francisco, Calif.

Application March 3, 1943, Serial No. 477,832

14 Claims. (Cl. 25—99)

This invention relates to a molding machine for molding blocks, slabs, etc., of the type shown in my co-pending application entitled "Wall structure" filed October 11, 1940, Serial No. 361,209, and especially to a machine which is designed for continuous operation and quantity production.

The object of the present invention is generally to improve and simplify the construction and operation of molding machines, to provide a machine in which blocks, slabs, etc., of a different size and shape may be simultaneously molded; to provide a machine in which a plastic material such as concrete may be placed in traveling or continuously moving molds at one end of a machine having such a length and speed of travel that the plastic material will be sufficiently set to permit removal of the molded articles at the opposite end of the machine; to provide a machine in which the molds may be individually adjusted in length to a fraction of an inch to insure what may be termed precision fitting of blocks and slabs when this is necessary; and, further, to provide means in connection with each mold whereby inserts in the form of keepers or the like to be embedded in the plastic material may be positioned and held during the pouring of the plastic material and the setting thereof.

The molding machine is shown by way of illustration in the accompanying drawings, in which:

Figure 1 is a diagrammatic view showing one end of the machine in side elevation;

Figure 2 is a perspective view of one of the cross-bars;

Figure 3 is a perspective view showing the hinge lugs whereby the side bars 15a are connected;

Figure 4 is a plan view of a portion of the mold assembly;

Figure 5 is a longitudinal section taken on line V—V of Figure 4;

Figure 6 is a plan view of belt 11 partly broken away;

Figure 7 is an enlarged cross-section taken on line VII—VII of Figure 4;

Figure 8 is an enlarged cross-section of a cross-bar showing an end mold section carried thereby;

Figure 9 is a section similar to Figure 8 showing an end mold section for a corner slab;

Figure 10 is a perspective view of strap 75 and a portion of bar 71;

Figure 11 is an enlarged cross-section of the machine;

Figure 12 is a plan section of a wall constructed from slabs cast in the molding machine;

Figure 13 is a perspective view of a keeper partially broken away;

Figure 14 is a perspective view of a cross-tie member;

Figure 15 is a perspective view of an interlocking member; and

Figure 16 is a perspective view of bar 60.

Referring to the drawings in detail, and particularly to Figs. 1 to 7 inclusive, and Fig. 11, it will be noted that a frame is disclosed which consists of vertically disposed, interspersed channel bars or stanchions such as inidcated at 2—2, connected at their upper ends by guide bars 3—3 which extend substantially from end to end of the machine. The frame will, in actual practice, be 300 feet or more in length. Z-shaped bars 4—4 also extend substantially from end to end of the frame and are secured to the stanchions just below the guide bars. A second set of guide bars 3a—3a is secured to the stanchions at a point substantially midway of the height of the stanchions, and below the guide bars 3a—3a are secured angle bars 5—5 and 6—6. The guide bars 3a—3a and the angle bars 5—5 and 6—6 will extend substantially the length of the frame and all are riveted, welded or the like to the stanchions to form a rigid frame.

A second set of stanchions 7—7 are arranged on each side of the main frame and are tied to the main frame by cross-bars 8—8 and angle braces 9—9 as clearly shown in Figure 11.

Journalled at opposite ends of the main frame between the stanchions 2—2 is a pair of drums or pulleys 10, and carried and driven by said pulleys is an endless belt 11, the upper reach of which is supported throughout its length by closely spaced rollers 12 journaled between the Z bars 4—4. Also journaled at opposite ends of the main frame is a pair of sprocket gears 14, which are triangular-shaped in cross section, as clearly shown in Fig. 1, and carried by said sprockets is a pair of chains, generally indicated at 15. These chains rest on top of belt 11 and are disposed on opposite sides thereof. Belt 11 forms the bottom of a series of molds, while the chains 15 form the sides of the molds, as will hereinafter be described.

The construction of the chains is best shown in Fig. 3. They consist of long bars or links 15a at one end, and on the outer side of which is formed a pair of hinge lugs 16. On the opposite end of each bar and also on the outer side is formed a hinge lug 17 which enters between the lugs 16 of an adjacent bar. All lugs are perforated to receive a pintle, thus pivotally connecting the bars to form a continuous chain. To insure positive aligning of the bars, a recess 18 is formed at one end into which a lug 19 carried by an adjacent bar enters when the bars align. A ledge 20 is formed on the inner face of each bar and extends from end to end thereof, and a series of closely spaced perforations 21 are formed in each bar above the ledge, the purpose of which will hereinafter be described.

When the machine is in operation, it is absolutely essential that belt 11 and the chains 15 travel in unison and at the same speed. To insure uniformity of movement, the hinge lugs 16 and 17 are formed on the exterior sides of the bars and, as such, project outwardly from the same. The outwardly and downwardly extending projections thus formed are utilized to form an interlock with the belt 11, and this is accomplished by forming recess 22 in each side of belt 11, as shown in Fig. 6. The hinge lugs project into these recesses and thus interlock with the belt, and, as such, the bars and the belt will move in absolute unison. The stanchions 7—7 disposed on opposite sides of the stanchions 2—2 or, in other words, the main frame, form two side frames one on each side of the main frame. Pulleys such as shown at 25 are journalled at each end of each side frame, and each set of pulleys carries and drives endless belts 26—26 which are supported throughout their length by closely spaced rollers 27 journalled in the side frames. These endless belts form movable platforms upon which the men operating the machine stand or walk back and forth as they perform their work. The movable platforms move at the same speed as the molding belt. In actual practice a driving sprocket gear 28 is secured on a shaft 29 (see Fig. 1), which carries two of the pulleys 25 whereby belts 26 are driven. A second sprocket gear 30 secured on the same shaft transmits power through a chain 31 to a sprocket gear 32 secured on shaft 33 which in turn carries one of the drums or pulleys 10 whereby belt 11 is driven. The ratio of the several sprockets employed is such that when power from a suitable source is transmitted to the first driving sprocket gear 28, belts 26 and 11 will be driven at the same speed, and as there is an interlock between belt 11 and the bars forming the chains 15, these will also be driven in unison with belt 11, and the sprockets 14 supporting the chains will merely function as idlers. There is one more endless belt, which is indicated at 35. This belt is supported by idler pulleys 36 journalled in the main frame one at each end. Blocks of wood, 35a, rubber or a suitable composition material are secured to belt 35, and these function as a support for the lower or return section of belt 11 and chains 15, belt 35 being in turn supported throughout its length by closely spaced rollers 37 journalled in the main frame. Belt 35, by supporting belt 11 and chains 15, prevents excessive sag, and as most of the weight of belt 11 and chains 15 is carried by belt 35, the friction between them is sufficient to drive or impart continuous movement to belt 35.

The machine disclosed in this instance is particularly intended for casting or molding wall slabs or blocks such as illustrated in Figs. 12 to 15, inclusive. The blocks or slabs disclosed are made of concrete and in most instances have embedded therein metal keepers both at their ends and on their inner faces, the type of keeper employed being best illustrated in Fig. 13. This keeper is in general channel-shaped in cross section. It consists of a web portion 40 and side flanges 41 which are bent at right angles as at 42 to form a slot 43 between them. The web is cut at spaced intervals as at 44 to form outwardly bent anchor members 45. When the slabs are being molded or cast, the keepers must be supported with relation to the inner faces of the slabs, as indicated at C, also at the ends of the slabs as indicated at D, and at the corners as indicated at E (see Fig. 12).

In order to support the keepers during the molding or casting operation so that the keepers will be properly positioned and embedded in the concrete, cross-bars such as shown in Fig. 2 are employed. Each cross-bar consists of two angle bars 50 which are welded or otherwise secured at their opposite ends to rectangular-shaped blocks 51—51. The angle bars 50 are spaced apart to form a slot 52 between them, and the angle bars are drilled to receive supporting pins in the form of nails such as shown at 53. Secured to each of the blocks 51 are a pair of bolts 54, and slidably mounted on said bolts are plates 55, the upper portions of which are bent to form hand grips 56. The plates 55 have their central portions cut out, as shown at 57, to straddle the angle bars 52. A spring 58 is placed on each bolt 54 intermediate the head of the bolt and the plate 55, thus normally holding the plates 55 in engagement with the blocks 51. Each plate 55 has a pair of pins 59 secured thereto which extend through and are slidable in the blocks 51. Thus, if an operator working on the molding machine grasps a cross-bar, such as shown in Fig. 2, by the handles 56 and exerts pressure to pull the handles toward each other, each handle will slide inwardly on the bolts 54 and compress the springs 58, and will at the same time retract the pins 59 into the blocks 51. With the pins 59 retracted, the operator will place the cross-bar cross-wise of belt 11 and place it on the inner ledges 20 of the bars 15a forming the sides of the mold, and he may slide the cross bar along the ledges until a desired position is assumed. Then by releasing pull on the hand grips, springs 58 will force the hand grips back into contact with the blocks 51, and pins 59 will at the same time become projected and, as such, will enter the perforations 21 formed in the sides of the bar 15a.

The cross-bars serve two functions, to wit—first, that of suspending and securing the keepers indicated at C in Fig. 12 during the molding operation, and, secondly, that of securing the ends of a mold. The manner in which the keepers indicated at C are suspended from the cross-bars and held in position is accomplished as follows: A T-shaped bar, such as shown at 60 in Fig. 16, is passed through a keeper such as shown in Fig. 13, with the web 60a of the bar 60 projecting outwardly from the slot 43 of the keeper. The web 60a of the bar 60 is then placed in the slot 52 of the cross-bar B, and when in position the pins or nails 53 are passed through the perforations in the angle bars 52 and through aligning perforations 53a formed in the bars 60, and when so placed the keeper will be suspended and secured below the cross-bar B (see Fig. 4). The cross-bar with the keeper suspended from it is then ready to be placed crosswise of belt 11 and to be supported by the ledges 20 formed on the inner sides of the bars 15a forming the sides of the mold and to be secured in the proper position by entering pins 59 of the cross-bar into the perforations 21 formed in the bars 15a, the cross-bars when so positioned and secured being clearly shown at B—B in Figs. 4 and 5.

The second function of the cross-bars, to wit, that of supporting the end sections of a mold, can best be described by reference to Figs. 4, 5, 8, 9 and 10. If slabs are being molded for the wall of a building, as shown in Fig. 12, it is obvious that slabs of varying length will be required, and also that slabs will be required to form corners, as indicated at E of Fig. 12. The perforations 21 in the bars 15a forming the sides of the mold, may in actual practice be spaced an inch apart. Hence, if a slab is required which is, for instance, 3 feet, 2 inches long, the cross-bar B carrying an end section of a mold may be set between the bars 15a to give that dimension, but if the slab should be 3 feet, 2½ inches long, it could not be taken care of unless some other adjustment was provided. In Fig. 8 an end section for a mold is shown at 70 which is carried by a flat, vertically disposed bar 71 suspended between the angle bars 50 of a cross-bar B by nails 53 in the same manner as the T-shaped bar 60. The end section 70 has two screw-threaded holes formed in one side into which extend a pair of bolts 72 terminating in wing nut heads 73. Each bolt has formed midway of its length a collar 74 which is straddled by a strap 75 in which the collar and bolt are freely rotatable by means of the wing nut head. Thus by backing up on a lock nut 76 carried by each bolt, the bolts may be rotated, and if rotated in one direction, the end mold section will be forced away from the bar 71 a distance, for instance, of one-half inch and then secured in place by tightening the lock nuts 76. In this manner slabs of a length ending in a fraction of an inch may be taken care of.

The end section of the mold shown at 70 in Fig. 8 is also utilized to support a keeper, this being accomplished by using a T-shaped bar similar to the one shown at 60 in Fig. 16, and inserting it in a slot 77 formed in the end section 70, and then securing it by pins or nails as indicated at 78.

The end mold section 80 shown in Fig. 9 is substantially identical in construction and operation to that shown in Fig. 8, the only difference being that it ends in an angular face 81 to form a corner slab. In this instance it is also necessary to bend the T-shaped bar 82 at the outer end in order to support the keeper at right angles to the angular face 81.

In actual practice, if concrete slabs or the like are to be molded or cast, belt 11 will be made of a metallic nonrusting endless belt of a width and length required, and the direction or movement of the belt will be from right to left. The width of the belt is constant and the side bars 15a forming the sides of the mold are constant in shape and position as they interlock with the belt 11. The operators stand on the endless belt platforms disposed on opposite sides of the molding belt and move in the same direction as the casting or molding belt, and at the same speed. At the right hand end of the machine, the operators place the cross-bars in position between the bars 15a. First there is placed in position by means of a cross-bar an end mold section, such for instance as shown in Fig. 8; then they place a number of cross bars from which are suspended keepers, and then finally another end section such as shown in Fig. 8 or 9 depending upon whether wall slabs or corner slabs are to be formed. Obviously, slabs of any length may be formed. The cross bars B are placed in position, for instance, by one or two operators, and as the belt passes on, the concrete is placed in the molds in any suitable manner. This completes the work at the right hand end of the machine which, as previously stated, may be 300 feet or more in length between pulleys. The belt may travel at an average speed of, for instance, 10 feet per minute more or less. The mortar or concrete applied in a plastic state at the right hand end of the belt must set and develop strength by the time it reaches the left hand or opposite end so that the slabs may be handled, that is, removed without injury or breakage. Rapid setting may be accomplished by introducing chemical accelerator into the plastic mortar. One notable accelerator is aluminum stearate which when introduced into the Portland cement mortar accelerates the setting rate according to the amount of accelerator used. It is anticipated that the optimum use of this accelerator will require a casting belt of substantially the length specified.

When the slabs have set sufficiently and are strong enough to be removed, it is accomplished by operators who merely grip the handle sections 57 of the cross-bars, one at each end of the slab, and lift them clear of the belt and when they are removed from the belt they may be placed on another conveyor, not shown, or on platforms or the like. Here other operators will release the cross-bars B by removing the nails 53 and lifting the cross-bars clear of the T-shaped bars 60. The T-shaped bars may then be removed by pushing them endwise out of the keepers. The same operation is performed with the end sections of the mold.

The metallic molding belt 11 being flexible, readily passes around its pulleys, but the sides of the mold, or in other words, the bars 15a as they are rigid cannot pass around the pulleys. Accordingly, the side forms or bars 15a are hingedly connected thus making it possible for them to pass around sprockets such as previously described. The casting or molding belt 11 is amply supported throughout its length by the closely spaced rollers placed below the belt, thus forming a rigid support for the molds during the placing of the plastic mortar and during the setting period. The casting belt is also supported during the return by the belt 35 and the blocks 35a carried thereby also by the closely spaced rollers disposed under this belt. The speed with which the several belts travel may be varied for instance by introducing a speed changer at the point of power application, but as this is an obvious procedure, no illustrations thereof is thought necessary. With this machine slabs of practically any length desired may be produced with continuous operation and the length may be determined to the smallest fraction of an inch due to the adjustment permitted by the bolts 72. A wall constructed of slabs of this character is shown in Fig. 12. The keepers placed in the inner faces of the slabs receive cross-tie plates such as shown in Fig. 14, thus tying an inner and an outer wall together. Where corners are formed, the keepers are tied together by an I-shaped interlocking member such as shown in Fig. 15 and where slabs are joined end to end in the wall they are joined by a similar I-shaped member, for instance, as indicated at D. Slabs forming a wall of this character are accordingly rapidly and cheaply produced and the erection of a wall of this character is also rapidly accomplished.

Having thus described my invention, what I claim and desire to secure by Letters Patent, is:

1. In a machine of the character described, an elongated frame, a pulley journaled at each end of the frame, an endless belt carried by said pulleys and forming a bottom of a series of molds, a plurality of hingedly connected side bars disposed on each side of the belt, said bars forming a pair of endless chains and also forming the sides of the molds, pairs of sprocket gears journaled at each end of the frame and supporting the endless chains, cross-bars inserted between the side bars to form the ends of a series of molds, and means forming an interlock between the belt and the side bars of the endless chains.

2. In a machine of the character described, an elongated frame, a pulley journaled at each end of the frame, an endless belt carried by said pulleys and forming a bottom of a series of molds, a plurality of hingedly connected side bars disposed on each side of the belt, said bars forming a pair of endless chains and also forming the sides of the molds, pairs of sprocket gears journaled at each end of the frame and supporting the endless chains, cross-bars inserted between the side bars to form the ends of a series of molds, means forming an interlock between the belt and the side bars of the endless chains, and means for imparting movement to the belt, the side bars and the cross-bars in unison.

3. In a machine of the character described, an endless belt forming the bottom of a series of molds, a plurality of hingedly connected side bars disposed on each side of the belt and forming the sides of the molds, cross-bars detachably secured between the side bars to form the ends of a series of molds, and means on the cross-bars for supporting metal members to be embedded in the slab cast in the mold.

4. In a machine of the character described, an endless belt forming the bottom of a series of molds, a plurality of hingedly connected side bars disposed on each side of the belt and forming the sides of the molds, cross-bars inserted between the side bars and end bars carried by the cross-bar and forming the ends of a series of molds, and means for adjusting the end bars to and away from the cross-bars to vary the length of the molds.

5. In a machine of the character described, an endless belt forming the bottom of a series of molds, a plurality of hingedly connected side bars disposed on each side of the belt and forming the sides of the molds, cross-bars inserted between the side bars, an end bar carried by each cross-bar and forming the ends of a series of molds, means whereby the cross-bars and the end bars carried thereby may be adjusted longitudinally of the side bars to vary the length of the molds, and means for adjusting the end bars to and away from the cross-bars to further vary the length of the molds.

6. In a machine of the character described, an endless belt forming the bottom of a series of molds, a plurality of hingedly connected side bars disposed on each side of the belt and forming the sides of the molds, cross-bars inserted between the side bars, an end bar carried by each cross-bar and forming the ends of a series of molds, and means on the end bars for supporting keepers to be embedded in a slab cast in the mold.

7. In a machine of the character described, an endless belt forming the bottom of a series of molds, a plurality of hingedly connected side bars disposed on each side of the belt and forming the sides of the molds, cross-bars inserted between the side bars, an end bar carried by each cross-bar and forming the ends of a series of molds, other cross-bars insertable between the side bars and the cross-bars carrying the end bars, and means on said other cross bars for supporting keepers to be embedded in the inner faces of slabs cast in the molds.

8. In a machine of the character described, an endless belt forming the bottom of a series of molds, a plurality of hingedly connected side bars disposed on each side of the belt and forming the sides of the molds, a plurality of cross-bars inserted between the side bars, manually actuated means for each cross-bar for securing or releasing the cross-bars with relation to the side bars, means on certain cross bars forming the ends of a series of molds, and means on the other cross-bars for supporting keepers to be embedded in the inner faces of slabs cast in the molds.

9. In a machine of the character described, the combination with an endless belt forming the bottom of a series of molds and a plurality of hingedly connected side bars disposed on each side of the belt and forming the sides of the molds, of a cross-bar inserted between the side bars, said cross-bar having a hand grip at each end movable longitudinally of the cross-bar, spring means engaging each hand grip and normally maintaining each hand grip at each end of the cross-bar, a pair of pins secured to each hand grip and normally extending into perforations formed in the side bars to detachably secure the cross-bar, said hand grips when manually grasped and pulled towards each other against the springs causing retraction of the pins and release of the cross-bar from the side bars.

10. In a machine of the character described, the combination with an endless belt forming the bottom of a series of molds and a plurality of hingedly connected side bars disposed on each side of the belt and forming the sides of the molds, of a cross-bar inserted between the side bars, said cross-bar having a hand grip at each end movable longitudinally of the cross-bar, spring means engaging each hand grip and normally maintaining each hand grip at each end of the cross-bar, a pair of pins secured to each hand grip and normally extending into perforations formed in the side bars to detachably secure the cross-bar, said hand grips when manually grasped and pulled towards each other against the springs causing retraction of the pins and release of the cross-bar from the side bars, a slot formed in the cross-bar and extending longitudinally thereof between the hand grips, a bar insertable in said slot, means for detachably securing the bar in the slot, and an end bar carried by said bar.

11. In a machine of the character described, the combination with an endless belt forming the bottom of a series of molds and a plurality of hingedly connected side bars disposed on each side of the belt and forming the sides of the molds, of a cross-bar inserted between the side bars, said cross-bar having a hand grip at each end movable longitudinally of the cross-bar, spring means engaging each hand grip and normally maintaining each hand grip at each end of the cross-bar, a pair of pins secured to each hand grip and normally extending into perforations formed in the side bars to detachably secure the cross-bar, said hand grips when manually grasped and pulled towards each other against the springs causing retraction of the pins and release of the cross-bar from the side bars, a slot formed in the cross-bar and extending longitudinally thereof between the hand grips, a bar insertable in said slot, means for detachably securing the bar in the slot, and an end bar adjustably secured to the said bar for movement to and away from the bar.

12. In a machine of the character described, the combination with an endless belt forming the bottom of a series of molds and a plurality of hingedly connected side bars disposed on each side of the belt and forming the sides of the molds, of a cross-bar inserted between the side bars, said cross-bar having a hand grip at each end movable longitudinally of the cross-bar, spring means engaging each hand grip and normally maintaining each hand grip at each end of the cross-bar, a pair of pins secured to each hand grip and normally extending into perforations formed in the side bars to detachably secure the cross-bar, said hand grips when manually grasped and pulled towards each other against the springs causing retraction of the pins and release of the cross-bar from the side bars, a slot formed in the cross-bar and extending longitudinally thereof between the hand grips, a bar insertable in said slot, means for detachably securing the bar in the slot, and means for suspending a keeper from said bar.

13. In a machine of the character described, the combination with an endless belt forming the bottom of a series of molds and a plurality of hingedly connected side bars disposed on each side of the belt and forming the sides of the molds, of a cross-bar inserted between the side bars, said cross-bar having a hand grip at each end movable longitudinally of the cross-bar, spring means engaging each hand grip and normally maintaining each hand grip at each end of the cross-bar, a pair of pins secured to each hand grip and normally extending into perforations formed in the side bars to detachably secure the cross-bar, said hand grips when manually grasped and pulled towards each other against the springs causing retraction of the pins and release of the cross-bar from the side bars, a slot formed in the cross-bar and extending longitudinally thereof between the hand grips, a bar insertable in said slot, means for detachably securing the bar in the slot, and forming the end of a mold, and means for detachably securing a keeper to said end bar.

14. In a machine of the character described, an elongated frame, a pulley journaled at each end of the frame, an endless belt carried by said pulleys and forming the bottom of a series of molds, a plurality of hingedly connected side bars disposed on each side of the belt, said bars forming a pair of endless chains and also forming the sides of the molds, pairs of sprocket gears journaled at each end of the frame and supporting the endless chains, cross-bars inserted between the side bars to form the ends of a series of molds, an endless belt disposed on each side of the frame and forming platforms for operators to work upon, and means for imparting movement to the first named belt, the endless chains, the cross-bars carried by said chains, and the platform belts in unison.

ROY B. TEDROW.